United States Patent [19]

Nevill

[11] Patent Number: 4,955,509

[45] Date of Patent: Sep. 11, 1990

[54] DISPENSING OF LIQUIDS

[75] Inventor: David C. E. Nevill, Northwood, England

[73] Assignee: Cadbury Schweppes plc, London, England

[21] Appl. No.: 333,493

[22] Filed: Apr. 4, 1989

[30] Foreign Application Priority Data

Apr. 8, 1988 [GB] United Kingdom ............... 8808193

[51] Int. Cl.⁵ ............................................. B67D 5/56
[52] U.S. Cl. .............................. 222/129.4; 222/284; 222/362; 222/370; 222/135
[58] Field of Search ............... 222/284, 370, 362, 273, 222/274, 129.3, 129.4, 135

[56] References Cited

U.S. PATENT DOCUMENTS

| | | | |
|---|---|---|---|
| 1,012,439 | 12/1911 | Rehfuss | 222/362 |
| 2,702,656 | 2/1955 | Bates | 222/362 |
| 2,901,150 | 8/1959 | Matter | 222/370 |
| 3,881,636 | 5/1975 | D'Aubreby . | |
| 4,033,482 | 7/1977 | Kushner et al. | 222/370 |

FOREIGN PATENT DOCUMENTS

| | | |
|---|---|---|
| 0022589 | 1/1981 | European Pat. Off. . |
| 14632 | 9/1880 | Fed. Rep. of Germany . |
| 2108175 | 5/1972 | France . |
| 9075 | of 1894 | United Kingdom ............... 222/362 |
| 28371 | of 1903 | United Kingdom ............... 222/370 |
| 224957 | 11/1924 | United Kingdom . |
| 467742 | 6/1937 | United Kingdom . |

Primary Examiner—H. Grant Skaggs
Attorney, Agent, or Firm—Klauber & Jackson

[57] ABSTRACT

A beverage dispensing system is disclosed which uses throw-away plastic packages in which beverage concentrate is contained. The package comprises a body and an integral valve. The valve has a sleeve in which is contained a rotary barrel. The barrel defines two subchambers. As the barrel is turned by a drive of the machine, the valve is positioned so that one of the subchambers dispenses its contents into a drinking vessel, while the other refills and vice versa. As long as concentrate is being dispensed, diluent is also being dispensed into the vessel to form the final beverage.

3 Claims, 4 Drawing Sheets

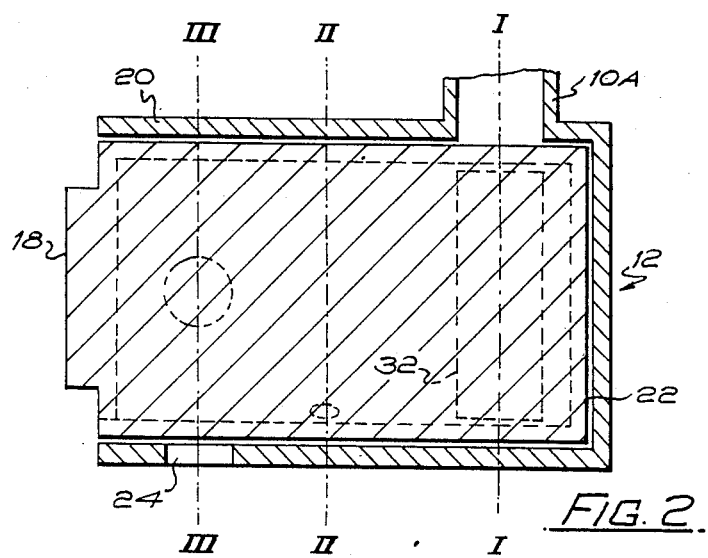
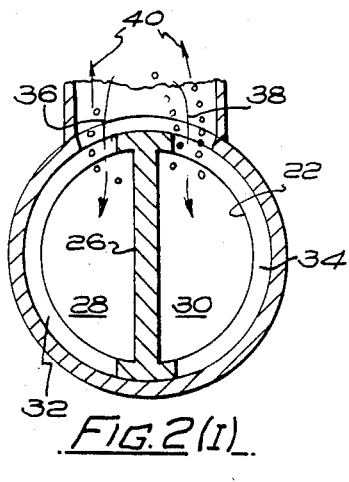
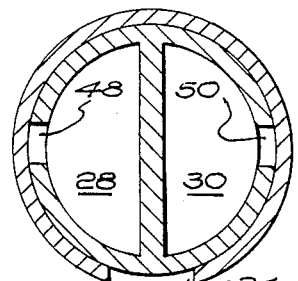
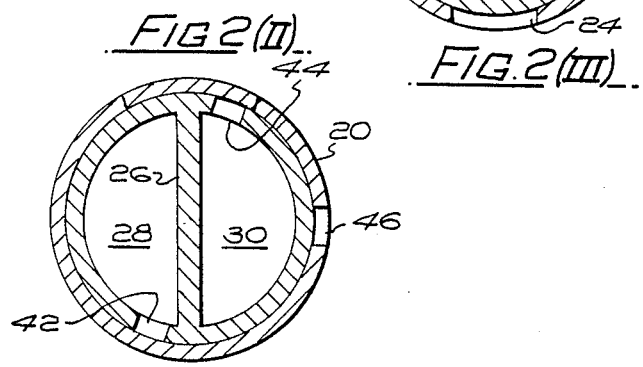

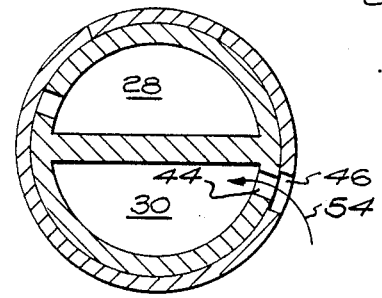
FIG.3(III).

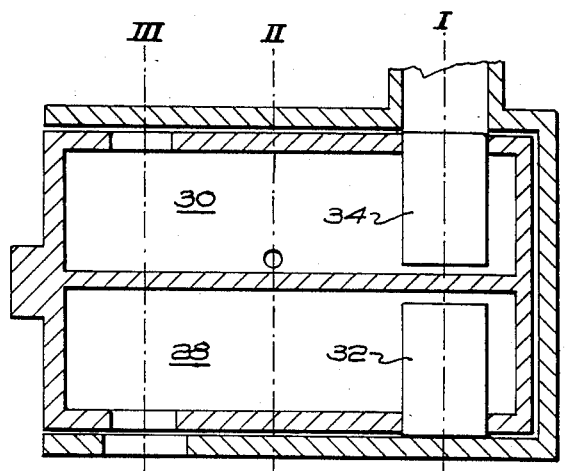
FIG 4.
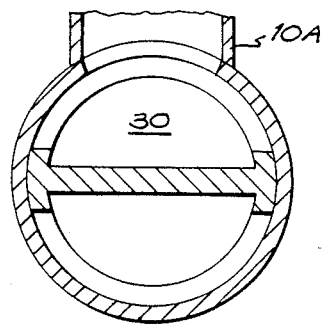
FIG.(4I)
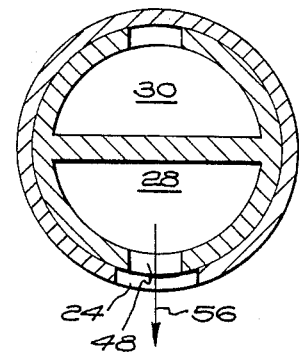
FIG.4(II)
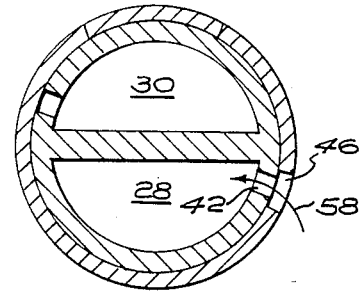
FIG.4(III)

DISPENSING OF LIQUIDS

This invention relates to the dispensing of liquids, and concerns particularly but not exclusively, the dispensing of beverages into vessels from which the beverages are to be consumed.

In the dispensing of beverages for example in cafeterias, restaurants and places of work such as offices and factories, it is known to provide a beverage dispensing machine which is equipped to dispense simultaneously a concentrate such as a flavouring syrup, and a diluent such as water, for example chilled carbonated water, these constituents being mixed to form the final beverage. In such machines, the drinking vessel typically a cup is held under an outlet to catch the constituents so that the beverage may be consumed directly from the cup. The dispensing machine may be operated by means of a button, a lever or other mechanism and where appropriate, the dispensing machine may be coin operated.

In one proposal for the dispensing concentrate as disclosed in our British Patent Applications Nos. 8722852 and 8804120 (abandoned without publication) a disposable container for the concentrate is designed to ensure that at each operation of the machine, a metered dose of concentrate will be dispensed. The metered dose may be for example sufficient to provide a single drink, being typically one cupful, or the container may be designed to dispense a fraction of a drink so that multiple operations of the machine are required for the dispensing of a single drink.

The said proposal has particular application, as indicated above when the container is disposable, because it is intended that the concentrate should be supplied to the user in such containers and the user simply inserts the container in the machine in such a fashion that operation of the machine will effect dispensing of the concentrate from the container. The diluent supply side of the machine will be suitably a permanent fixture of the machine and where the diluent is water, the diluent supply can be the mains.

The container according to said proposal is provided with integral valve means ensuring the dispensing of measured doses of liquid, and the valve means is operated each time the machine is operated so that a measured dose of liquid will be dispensed, and the means for measuring the dose of liquid is also integral with the container.

Although it is desired that the machine operates on the container when positioned therein, in an alternative arrangement, the container valving may simply be operated by hand in order to effect the dispensing of the metered dose of liquid.

Dispensing systems comprising a machine for dispensing diluent and for receiving a disposable container containing concentrate and having an integral valve for the dispensing of the concentrate whilst dispensing of the diluent is taking place to provide a beverage are known, and examples of such systems and containers therefor are disclosed in British Patents Nos. 1537699 and British Patent No. 2037255B. In the first mentioned British Patent, the container disclosed comprises an outlet tube in which is contained a metallic armature and when the container is fitted into the machine, the tube locates in an electric coil which when exited causes the armature to move inside the tube outlet between a filling position in which liquid from the container flows into a sub-chamber in the armature, and a dispensing position in which the liquid from the sub-chamber drains under gravity out of the outlet tube, and in the dispensing position, further liquid is prevented from entering the sub-chamber whereby a measured dose of liquid is dispensed. The shortcoming of this arrangement is that the container is designed to be disposable but obviously the armature is an expensive component, and is not therefore disposed of when the container is empty. The armature and the sub-chamber therefore have to be cleaned and sterilised before re-use. The inventor of the first mentioned British Patent recognises this difficulty, because he is also the inventor of the invention of the second mentioned patent and an objective of the second mentioned patent is to overcome the difficulty of having to clean and re-use the armature.

In the second mentioned patent, the inventor's solution is to provide the container with an integral bellows which is flexible and defines the sub-chamber. The armature is now a permanent part of the machine and acts directly upon the bellows in order to compress same in a first stroke of the armature for the pumping of the liquid therefrom, whilst the movement of the armature in the opposite direction allows the bellows to expand and draw in another charge of liquid, appropriate valving being provided to ensure that whilst pumping from the bellows sub-chamber is taking place, reverse flow back into the container is prevented whereby metered quantities of the liquid are dispensed.

The pumping of liquid, when it is a syrup concentrate, is undesirable in that the liquid can be ejected at too high a pressure such as to cause foaming and frothing when the syrup is mixed with carbonated water, leading to a loss of carbonation. Furthermore, although the dispensing system as described in the first mentioned patent is now in use, there is no evidence of the bellows chamber having been used in practise, and it can only be assumed that difficulty has been encountered with the dispensing of accurately metered doses from such a construction, on a consistant basis.

The container according to the present invention is also provided for the dispensing of metered doses of liquid, especially for a beverage dispensing system in which case the liquid will be a concentrate to be mixed with a diluent, and the invention is also concerned with dispensing systems which employ such containers.

According to the present invention there is provided a container for dispensing metered doses of liquid, comprising:
 (a) a body for holding a bulk supply of liquid;
 (b) valve means integral with the body;
 (c) a dispensing outlet in said valve means;
said valve means comprising relatively movable parts and having porting enabling the valve means to control the flow of liquid from the body to the dispensing outlet whereby the liquid may be dispensed in metered doses from said outlet so as to be caught in a drinking vessel, characterised in that one of said relatively movable parts comprises at least first and second sub-chambers of predetermined volume and which is moveable between at least two conditions namely a first condition in which liquid drains from the first sub-chamber through said dispensing outlet whilst the second or another sub-chamber fills with liquid from the body and a second condition in which liquid drains from the second or one of the other sub-chambers whilst the first sub-chamber fills with liquid from the body.

It is preferred that the sub-chambers are defined in a container part which is physically moveable relative to the other container part in which it is contained.

An advantage of this preferred arrangement as compared to the prior art is that the sub-chambers in being physically engaged and relatively displaced, can be constructed of relatively inexpensive material whereby the whole container can be made disposable when empty and the disadvantages of maintaining the armature type metering device of the prior art sterile are obviated or mitigated.

Additionally, as the sub-chambers are designed so that they fill directly from the bulk supply, and the liquid drains out of the sub-chambers under gravity, when the valve parts are in first and second conditions, there is no requirement to provide a pumping device such as a bellows embodied within the container.

Said relatively movable parts may comprise a barrel defining the sub-chambers on the one hand and a sleeve housing the barrel on the other hand, said sleeve in a preferred case being integral with the container body.

Preferably, said two sub-chambers are defined in the barrel, which is cylindrical, by means of a diametrical partition. The barrel preferably is rotatable in the sleeve which is cylindrical, said sleeve having an inlet leading to the interior of the body, an outlet for allowing the draining liquid from each sub-chamber to pass therethrough, and an air breathing hole to allow air to flow into each sub-chamber as the liquid drains therefrom to replace the displaced liquid.

To this end, each sub-chamber has a liquid inlet which can register with the sleeve inlet, an outlet which can register with the sleeve outlet, and a vent hole which can register with the sleeve air breathing hole. Thus, as will be understood when the first or second sub-chambers is filling, its inlet will register with the sleeve inlet and its outlet and air vent hole will be blocked, and the other sub-chamber is draining, and its inlet will be blocked and its outlet and vent hole will be in register with the sleeve outlet and air breathing hole.

The barrel can be rotated so as to position the sub-chambers accordingly and for example in the dispensing of a drink, during which diluent is also being dispensed into a drinking cup, the barrel may be turned (or indexed) as many times as required, for example two or three, to provide the correct amount of concentrate, for example two or three sub-chambers full of concentrate.

The barrel is preferably adapted to be moved between the said conditions by a drive means of a dispensing machine into which the container fits.

The machine preferably is a beverage dispensing machine, the container being for holding a beverage concentrate such as a flavouring syrup, the machine being adapted at the same time to dispense a diluent, such as water, and in particular chilled carbonated water, so that the machine can dispense carbonated beverages. The container may be of the disposable type which when full can be fitted to the machine and removed at will and replaced by a similar container but for example containing a syrup of a different flavour.

Instead of the barrel being movable by a drive means it may be adapted to be moved manually.

The invention also provides a dispensing machine adapted to receive at least one of the said containers in operative position therein so that the liquid in the container can be dispensed from the machine in measured doses, the machine also including diluent dispensing means whereby diluent can also be dispensed from the machine.

Preferably, the dispensing machine is for dispensing beverages, and the container is for containing liquid concentrate, whilst the diluent is water. When carbonated beverages are to be dispensed, the diluent will be carbonated water and the concentrate will be a flavouring syrup.

The machine preferably has drive means for effecting the relative displacement of the container parts of the container when placed in the machine, said drive means being operatively connected to the diluent supply means so that diluent will flow from the machine simultaneously with the concentrate.

The said drive means for displacing the movable container parts may be operated by a button, lever or the like which also simultaneously operates a means controlling the flow of diluent from the diluent supply. The flow of diluent and concentrate will arrange to be in a pre-set ratio to give a beverage of a pre-set pallatability.

When the contents of the container have been consumed, it is simply disposed of and replaced by another container. It is possible to remove the containers from the machine before they are empty, and to insert other containers containing concentrate of a different flavour. There will be appropriate arrangement for ensuring that the volume of concentrate which is dispensed at each operation is in a pre-set ratio to the quantity of diluent dispensed, based upon the type of concentrate which is being dispensed. For example, it may be necessary to make some of the sub-chambers for some concentrates smaller than those for other concentrates.

Although reference has been made herein to the use of two sub-chambers which alternate in their operational positions, it is possible to provide three or more sub-chambers which are arranged to operate in sequence so that as one sub-chamber is filling, another is draining even though there may be a third or other sub-chambers in a holding or transient stage wherein neither filling nor draining is taking place, and the invention should be construed accordingly.

The body, sleeve and barrel preferably comprise a disposable package which is simply thrown away after use, and of which the component parts are of plastics material for this purpose.

Embodiments of the invention will now be described, by way of example, with reference to the accompanying diagrammatic drawings, wherein:

FIG. 2 is a sectional elevation of the container valve shown in FIGS. 1 and 1A when in the at-rest or neutral condition;

Figure 3:
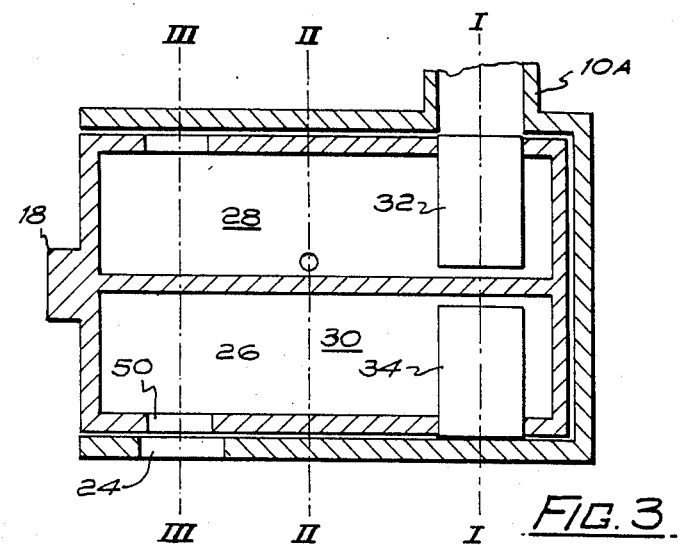
Figure 3I:
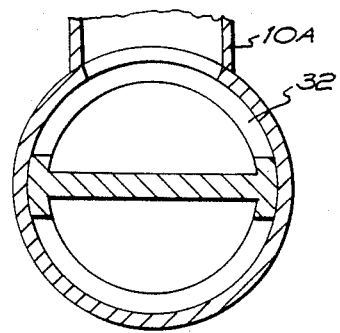
Figure 3:
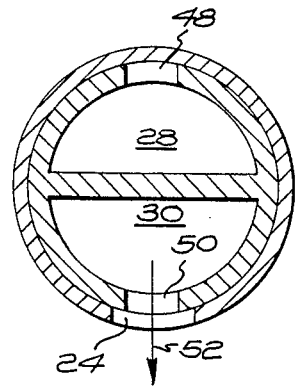

FIGS. 2(I), 2(II) and 2(III) are sectional views of the valve of FIG. 2 taken on the sections I—I, II—II and III—III respectively and when the valve is in the condition shown in FIG. 2; and FIGS. 3, 3(I), 3(II) and 3(III) and FIGS. 4, 4(I), 4(II) and 4(III) are views similar to FIGS. 2, 2(I), 2(II) and 2(III) but when the valve is in the first and second conditions of operation respectively.

Figure 1:
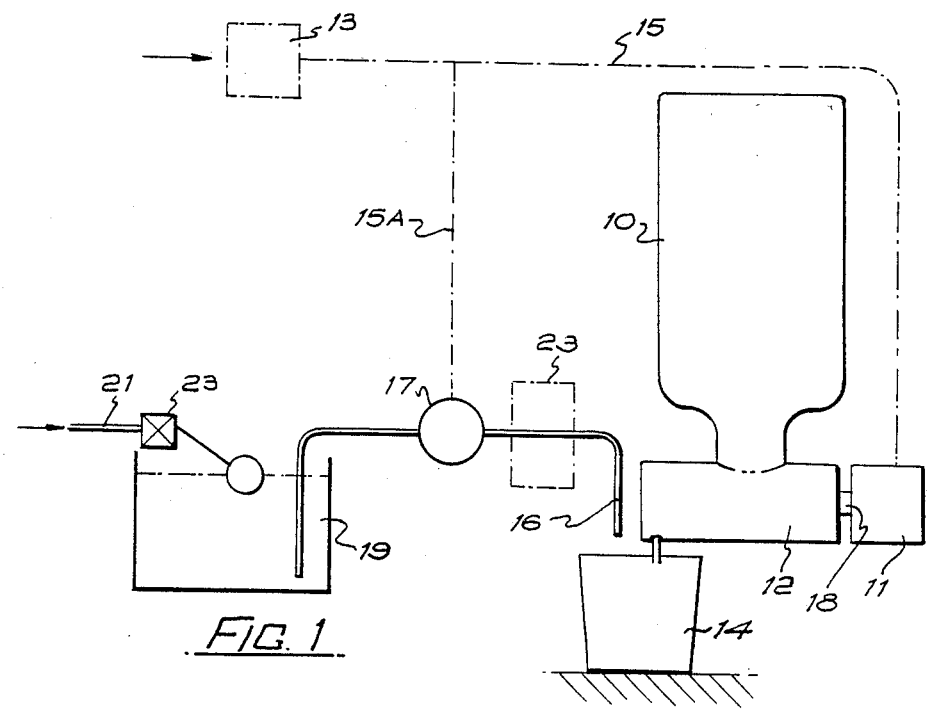
FIG. 1 is a side elevation of the basic elements of a dispensing system embodying the container according to the invention.

Referring to FIG. 1 of the drawings, a dispensing system comprises basically a container 10 which when positioned in the machine is in inverted condition, and has an integral valve 12 controlling the dispensing of a beverage concentrate from container 10 into a drinking vessel 14. A diluent outlet 16 supplies diluent to the vessel 14 in order to provide a quantity of beverage therein. The valve 12 is controlled by means of a drive tongue or shaft 18 and the drive tongue 18 is drivingly engaged by a drive motor 11. The motor 11 is controlled from a control mechanism 13 which may be a coin operated mechanism, a button operated mechanism or a lever operated mechanism and the actual nature of same is not of importance to this invention. When the mechanism 13 is operated however, the motor 11 is signalled to operate by virtue of the coupling line 15 and the motor turns and operates the valve 12 in a manner to be described hereinafter. The coupling line 15 has a branch line 15A which also operates a pump 17 in order to draw diluent from a supply tank 19 to supply to the outlet 16. As shown in FIG. 1, the diluent is supplied to the tank 19 from the mains supply 21 through a float control valve 23. The tank 19 may be embodied in the machine, but in an alternative construction, the mains 21 may be connected directly to the outlet 16 through a valve which replaces pump 17 and which is operated by the control mechanism 13.

It will be understood therefore that when the control mechanism 13 is operated, concentrate is dispensed from the container 10 whilst diluent namely water is dispensed from the outlet 16, and the concentrate and water are caught in the cup 14 and mixed to form a pallatable beverage.

Figure 1A:
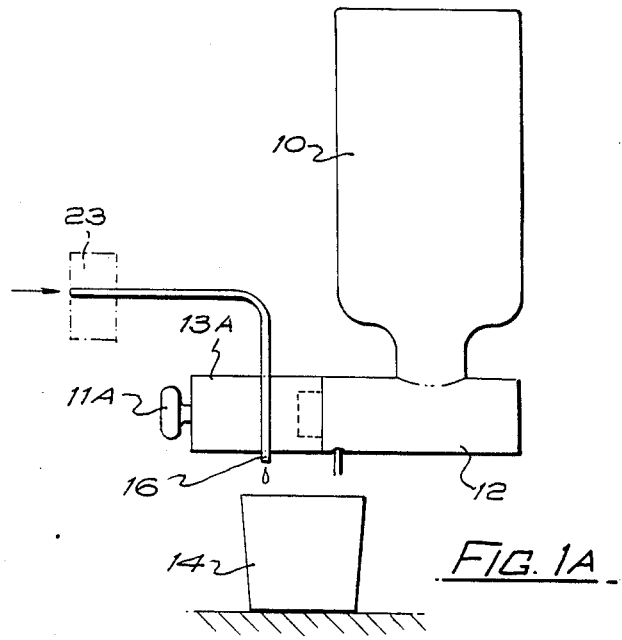
FIG. 1A is a view similar to FIG. 1, but showing an alternative embodiment.

In the arrangement shown in FIG. 1A, the apparatus is in fact operated manually, and the drive means is in the form of a handle 11A which the user simply turns in order to operate the valve 12, and at the same time allow diluent to flow from outlet 16 into the vessel 14. The handle 11A is coupled to a diluent valve mechanism 13A such that flow of diluent will be blocked as long as the handle 11A is in a particular position, namely the first condition of dispense but when the handle 11A is turned to the second and third condition as explained hereinafter, diluent will flow from outlet 16, and the concentrate will flow from the valve 12.

When the diluent is to be carbonated, the system may include a carbonating arrangement illustrated diagrammatically by reference 23 in FIGS. 1 and 1A. The carbonator tank, its feeding and discharge may be of conventional construction.

The present invention is mainly concerned with the construction of the package which comprises the container 10 and the integral valve 12. The package is a "sealed" or tamperproof unit in that the unit is designed to be incapable of being refilled, much like an aerosol pakcage and will be disposed of when empty. A specific novelty of the package resides in the construction of the valve 12 and reference is now made to FIGS. 2 to 4 for a description of the construction of the valve.

Referring firstly to FIG. 2, the valve comprises essentially an outer sleeve 20 and an inner barrel 22 which fits in the sleeve 20 in sealing fashion so that concentrate which flows from the container neck 10A will flow only into the barrel 22 through the said neck 10A and out of the barrel and out of an outlet 24 in the sleeve 20 so as to be caught in the drinking vessel 14. Flow through the valve takes place only by appropriate positioning of the barrel 22, the position of which is controlled by rotation of the shaft or tongue 18.

Reference is best made to FIGS. 2(I), 2(II) and 2(III) for better understanding of the construction and operation of the valve 12. In these Figs. the valve is in a neutral condition and as shown clearly the barrel is provided with a central partition 26 which splits the barrel into two internal sub-chambers 28 and 30 of equal volume and approximately semi-cylindrical in shape. At the lengthwise position represented by section I—I in FIG. 2, the barrel 22 is provided with two arcuate inlets 32 and 34 so that, as shown in FIG. 2(I) when the partition 26 lies in a vertical plane, each of the inlets 32 and 34 communicates with the container neck 10A, and concentrate can flow into both chambers 28 and 30. The flow of concentrate is indicated by arrows 36 and 38. At the same time any air in the chambers 28 and 30 flows in the opposite direction to arrows 36 and 38 and flows back into the container 10 and eventually into the head space therein. The back flow of air is indicated by arrows 40. The sub-chambers 28 and 30 can therefore fill with concentrate. At this time the concentrate cannot flow from either sub-chamber 28 or 30 out of the outlet 24.

There are two breather apertures 42 and 44 provided in the barrel 22 at section II—II, the apertures 42 and 44 being positioned as shown at diametrically opposite positions, and adjacent the partition 26. Also at the section II—II, the outer sleeve 20 is provided with a breathing aperture 46 at a position slightly below the horizontal diameter of the valve. The purpose of this aperture 46 is to allow communication of the sub-chambers 28 and 30 with the atmosphere through the aperture 42 and 44 when they are respectively in the appropriate position for dispensing, as will be explained hereinafter with reference to FIGS. 3 and 4.

At the section III—III in FIG. 2, the aperture 24 is provided as shown, but in addition the sub-chambers have outlets 48 and 50 lying at diametrically opposite positions and on the horizontal diameter in the FIG. 2(III) position, these apertures 48 and 50 respectively being for communicating with outlet 24 for the draining of concentrate from the sub-chambers as will be explained with reference to FIGS. 3 and 4.

It can be seen from the above that when the valve is in the FIG. 2 position, which is the neutral position of the valve, the sub-chambers 28 and 30 fill with concentrate and the valve is ready for a dispensing operation.

When a dispensing command is received, by virtue of operation of mechanism 13 or handle 11A, engagement between a drive means and tongue 18, the barrel is turned through 90° until the FIG. 3 position first condition is reached. It is to be noticed firstly that the partition 26 now lies in a horizontal plane, and the aperture 50 of chamber 30 aligns with aperture 24 as shown in FIGS. 3 and 3(III), and the venting aperture 44 aligns with breathing aperture 46 as shown in FIG. 3(II) so that on the one hand the concentrate can flow from sub-chamber 30 out of outlet 24 as indicated by arrow 52 in FIG. 3(II), and air can enter the chamber 30 to replace the displaced liquid through aligned apertures 44 and 46 as indicated by arrow 54. The chamber 30 therefore satisfactorily drains, and a metered quantity of the concentrate flows into the vessel 14. It should be mentioned that the aperture 32 as shown in FIG. 3(I) remains in fluid communication with the interior of the container 10 through the neck 10A ensuring that the chamber 28 remains filled with liquid.

Typically for the dispensing of a cup full of beverage, a quantity of syrup or concentrate representing twice or three times the volume of each sub-chamber 28 or 30 will be required, and therefore after a pre-set time sufficient to allow the contents of chamber 30 to drain into the vessel 14, the barrel is rotated again clockwise but this time by 180° until the position (second condition) shown in FIG. 4 is reached. In this position the contents of sub-chamber 28 are drained directly into the vessel 14 and the outlet 48 from the barrel aligns with outlet 24 to allow the concentrate to drain from outlet 24 as indicated by arrow 56 in FIG. 4(III), and air as indicated by arrow 58 in FIG. 4(II) can flow into chamber 28 by virtue of the alignment of breathing aperture 46 and vent aperture 42 as shown in FIG. 4(II). Whilst this draining is taking place, sub-chamber 30 is in communication with the interior of body 10 through aperture 34 as shown in FIG. 4(I) so that chamber 30 re-fills with concentrate, the air therein bubbling back into the container 10. If only two sub-chamber doses are required for the drink, in the final sequence of operations the barrel 22 is returned to the FIG. 2 neutral condition when the chamber 28 re-fills with concentrate and the air therein flows back into the container 10. However if three doses each of volume equal to the volume of one of the sub-chambers 28 and 30 are required, the barrel 28 is again turned through 180° to the condition to allow the contents of sub-chamber 30 to be drained as illustrated in FIG. 3 whilst the other sub-chamber 28 is re-filled, and following such discharge of the sub-chamber 30, the barrel is then returned to the neutral condition shown in FIG. 2.

The advantage of this arrangement is that it provides for rapid re-fill of one chamber while another chamber is discharging. The barrel 22 will be designed so that the size of each sub-chamber will be related to the type of concentrate to be dispensed therefrom.

The sizes of the various apertures 32, 34, 42, 44, 46, 48, 50 and 24 will be selected for optimum dispensing conditions. Apertures 48 and 50 could be one and the same as 32 and 34 in which case aperture 24 would be situated directly opposite to the neck 10A. In such a configuration the circumference of the wall section of the barrel between sub-chambers 28 and 30 will need to be sufficient to close aperture 24 when the barrel is in the first condition as in FIG. 2. Likewise, apertures 42 and 44 could be included in the side section of apertures 32 and 34. Additionally, by appropriate designing of these apertures, for example by using slots instead of circular apertures, the valve could be operated by being rotated continuously without stopping until the concentrate delivery has been completed. Also, instead of the part having the sub-chambers being relatively rotatable, it may be arranged to be relatively slidable for the functioning of the apparatus.

I claim:

1. A container for dispensing metered doses of liquid comprising:
    (a) a container body for holding a bulk supply of liquid which has an outlet at the top thereof and which is for use in an inverted position;
    (b) valve means integral with the container body;
    (c) a dispensing outlet in said valve means;
    (d) said valve means comprising a cylindrical outer sleeve which lies with its axis horizontal when the container is in use;
    (e) a sleeve inlet in said sleeve in communication with said outlet from said container body;
    (f) a cylindrical valve barrel rotatably positioned in said sleeve;
    (g) a partition in said cylindrical valve barrel, which splits said barrel into first and second metering chambers;
    (h) first and second inlet ports in said valve barrel located in a first vertical plane with said sleeve inlet, said first and second ports extending circumferentially of the valve barrel such that ends thereof lie closely adjacent the partition and such that the circumferential spacing between adjacent ends of said ports in less than the circumferential extent of the sleeve inlet;
    (i) first and second chamber outlets in said valve barrel which are in a second vertical plane spaced axially of the sleeve from said first vertical plane;
    (j) a sleeve outlet lying in said vertical plane;
    (k) first and second venting outlets in said valve barrel in a third vertical plane axially spaced from the first and second vertical planes, for venting of air from said chambers;
    (l) a venting outlet in said sleeve in said third vertical plane; and
    (m) the container being adapted for use so that the valve barrel can be turned in the sleeve so as to have three operational positions, including a first position in which two adjacent ends of the valve barrel inlet ports communicate with the sleeve inlet and the interior of the container body for filling of the first and second chambers simultaneously, in which position the venting outlet in the sleeve and the sleeve outlet are blocked; a second position in which the inlet port of the first chamber communicates with the sleeve inlet and the interior of the container body for filling of the first chamber with liquid, the second venting outlet which is associated with the second chamber being in communication with the venting outlet of the sleeve, while the second chamber outlet is in communication with the sleeve outlet for the discharge of the contents of the second chamber from the valve means; and a third position which is similar to the second position except that the second chamber fills while the first chamber drains, the container body and valve means therefore providing that at all times the bulk supply of liquid is in communication with and is always filling at least one of the first and second chambers.

2. A container according to claim 1, wherein the container and integral valve means are formed as a sealed, one piece disposable plastic material package.

3. A dispensing machine for dispensing beverages comprising:
    (a) means for receiving a container containing beverage concentrate so that a dispensing outlet thereof is located above a location for placement of a drinking vessel, said container being of the type including:
        (i) a container for dispensing metered doses of liquid comprising:
        (ii) a container body for holding a bulk supply of liquid which has an outlet at the top thereof and which is for use in an inverted position;
        (iii) valve means integral with the container body;
        (iv) a dispensing outlet in said valve means;
        (v) said valve means comprising a cylindrical outer sleeve which lies with its axis horizontal when the container is in use;
        (vi) a sleeve inlet in said sleeve in communication with said outlet from said container body;

(vii) a cylindrical valve barrel rotatably positioned in said sleeve;

(viii) a partition in said cylindrical valve barrel, which splits said barrel into first and second metering chambers;

(ix) first and second inlet ports in said valve barrel located in a first vertical plane with said sleeve inlet, said first and second ports extending circumferentially of the valve barrel such that ends thereof lie closely adjacent the partition and such that the circumferential spacing between adjacent ends of said ports is less than the circumferential extent of the sleeve inlet;

(x) first and second chamber outlets in said valve barrel which are in a second vertical plane spaced axially of the sleeve from said first vertical plane;

(xi) a sleeve outlet lying in said second vertical plane;

(xii) first and second venting outlets in said valve barrel in a third vertical plane axially spaced from the first and second vertical planes, for venting of air from said chambers;

(xiii) a venting outlet in said sleeve in said third vertical plane; and (xiv) the container being adapted for use so that the valve barrel can be turned in the sleeve so as to have three operational positions, including a first position in which two adjacent ends of the valve barrel inlet ports communicate with the sleeve inlet and the interior of the container body for filling of the first and second chambers simultaneously, in which position the venting outlet in the sleeve and the sleeve outlet are blocked; a second position in which the inlet port of the first chamber communicates with the sleeve inlet and the interior of the container body for filling of the first chamber with liquid, the second venting outlet which is associated with the second chamber being in communication with the venting outlet of the sleeve, while the second chamber outlet is in communication with the sleeve outlet for the discharge of the contents of the second chamber from the valve means; and a third position which is similar to the second position except that the second chamber fills while the first chamber drains, the container body and valve means therefore providing that at all times the bulk supply of liquid is in communication with and is always filling at least one of the first and second chambers;

(b) drive means for engaging the valve means to effect relative movement of said relatively movable parts to cause dispensing of metered doses of said concentrate; and (c) diluent supply means for supplying diluent to said location to be caught in said drinking vessel along with said concentrate and in a predetermined ratio to said concentrate when said drive means is operated.

* * * * *